(12) United States Patent
Shimonishi (10) Patent No.: US 6,173,331 B1
(45) Date of Patent: Jan. 9, 2001

(54) NETWORK NODE FOR SHARING A COMMON BUFFER AMONG MULTIPLE CONNECTIONS WHILE ENSURING MINIMUM BANDWIDTH FOR EACH CONNECTION

(75) Inventor: Hideyuki Shimonishi, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/166,377

(22) Filed: Oct. 5, 1998

(30) Foreign Application Priority Data

Oct. 3, 1997 (JP) .................................................. 9-286236

(51) Int. Cl.[7] ...................................................... G06F 13/00
(52) U.S. Cl. ........................ 709/232; 709/234; 709/235; 709/250; 370/229
(58) Field of Search ................................... 709/213, 223, 709/226, 230, 231, 232, 235, 238, 234, 250; 710/29, 52, 56; 370/229, 230, 235

(56) References Cited

U.S. PATENT DOCUMENTS

| | | | | |
|---|---|---|---|---|
| 4,849,968 | * | 7/1989 | Turner ................................... | 370/232 |
| 5,231,633 | * | 7/1993 | Hluchyj et al. ....................... | 370/429 |
| 5,291,481 | * | 3/1994 | Doshi et al. .......................... | 370/230 |
| 5,706,279 | * | 1/1998 | Teraslinna ............................. | 370/232 |
| 5,838,922 | * | 11/1998 | Galand et al. ........................ | 709/232 |
| 6,002,667 | * | 12/1999 | Manning et al. ..................... | 370/232 |

FOREIGN PATENT DOCUMENTS

| | | |
|---|---|---|
| 7-95209 | 4/1995 | (JP) . |
| 8-32623 | 2/1996 | (JP) . |
| 8-274793 | 10/1996 | (JP) . |
| 9-83546 | 3/1997 | (JP) . |

OTHER PUBLICATIONS

1998 General Conference onCommunications B–6–54, Mar. 27–30, 1998, Tokai University, Hiratsuka.
Communication Gazette SSE95–125–137, vol. 95, No. 398, pp. 1–6.

* cited by examiner

Primary Examiner—Viet D. Vu
(74) Attorney, Agent, or Firm—Scully, Scott, Murphy & Presser (57) ABSTRACT

A network node includes a single buffer connected to a transmission medium. Detection circuitry receives an incoming packet and detects the virtual connection of the received packet Control circuitry calculates a value of delivery instant for the received packet according to a minimum bandwidth assigned co the detected virtual connection so that vacancy of the transmission medium is reduced to a minimum if the received packet were delivered from the buffer onto the transmission medium at the instant of the calculated value. The calculated value is compared with a decision threshold assigned to the detected virtual connection. The received packet is stored into the buffer if the calculated value is smaller than the decision threshold or discarded if the calculated value is greater than the decision threshold.

23 Claims, 10 Drawing Sheets

Legend: Threshold: $H_1 = H_2 = 3$
Weight: $W_1 = W_2 = 1$

NETWORK NODE FOR SHARING A COMMON BUFFER AMONG MULTIPLE CONNECTIONS WHILE ENSURING MINIMUM BANDWIDTH FOR EACH CONNECTION

BACKGROUND OF THE INVENTION

1. Field of the Invention

The present invention relates generally to connection-oriented networks and more specifically to a network node having a first-in-first-out buffer for multiple connections.

2. Description of the Related Art

Japanese Laid-Open Patent Specification Hei-8-274793 describes a connection-oriented communication system which ensures minimum bandwidth for established virtual connections using a plurality of buffers associated respectively with the established connections. Japanese Laid-Open Patent Specification Hei-9-83547 discloses a connection-oriented communication system in which a plurality of buffers are provided to ensure minimum bandwidth for each buffer. However, the use of individual buffers for multiple connections would require a significant number of buffers if a large number of connections must be supported This also results in a significant increase both in complexity and hardware for implementing circuitry for controlling the buffers. In contrast, a single-buffer approach is disclosed in Japanese Laid-Open Patent Specification Hei-7-95209 in which a single buffer is commonly shared by all virtual connections for admission control procedure. In this procedure, the transmission rate of each connection is compared with the contract value of the connection. If the transmission rate of a connection exceeds its contract value, the packets of this connection are discarded. However, if this approach were used in a network node, the output transmission medium of the node cannot be utilized to its maximum efficiency.

SUMMARY OF THE INVENTION

It is therefore an object of the present invention to provide a network node for maximum utilization of a transmission medium by sharing a common first-in-first-out buffer among multiple virtual connections while ensuring minimum bandwidth for each connection.

According to a first aspect of the present invention, there is provided a network node comprising a first-in-first-out buffer connected to a transmission medium, detection circuitry for receiving an incoming packet and detecting a virtual connection of the received packet. Control circuitry is provided for calculating a value of delivery instant according to a minimum bandwidth assigned to the detected virtual connection so that vacancy of the transmission medium is reduced to a minimum if the received packet were delivered from the buffer onto the transmission medium at the instant of the calculated value. The calculated value is compared with a decision threshold assigned to the detected virtual connection. The received packet is stored into the buffer if the calculated value is smaller than the decision threshold or discarded if the calculated value is greater than the decision threshold.

According to a second aspect, the present invention provides a network node comprising first and second first-in-first-out buffers connected to a transmission medium, detection circuitry for receiving an incoming packet and detecting a virtual connection and a class of the received packet and control circuitry for calculating a value of delivery instant according to a minimum bandwidth assigned to the detected virtual connection so that vacancy of the transmission medium is reduced to a minimum if the received packet were delivered from either of the buffers onto the transmission medium at the instant of the calculated value, comparing the calculated value with a decision threshold assigned to the detected virtual connection, storing the received packet into one of the buffers depending on the detected class of the packet if the calculated value is smaller than the decision threshold, discarding the received packet if the calculated value is greater than the decision threshold, monitoring storage level of the first buffer and delivering packets from the second buffer onto the transmission medium if the first buffer is vacant and packets from the first buffer onto the transmission medium if the first buffer is not vacant.

According to a third aspect, the present invention provides a network node comprising a first-in-first-out buffer connected to a transmission medium, a memory, and an LSI chip including detection circuitry for receiving an incoming packet and detecting a virtual connection of the received packet, and control circuitry for reading a calculated value of delivery instant of the received packet from the memory, recalculating a value of delivery instant using the value read from the memory according to a minimum bandwidth assigned to the detected virtual connection so that vacancy of the transmission medium is reduced to a minimum if the received packet were delivered from the buffer onto the transmission medium at the instant of the recalculated value, comparing the recalculated value with a decision threshold assigned to the detected virtual connection, storing the received packet into the buffer if the recalculated value is smaller than the decision threshold, discarding the received packet and resetting the recalculated value to the read value if the recalculated value is greater than the decision threshold, and storing both of the recalculated and reset values of delivery instant into the memory.

According a fourth aspect, the present invention provides a method of controlling packets, comprising the steps of:

a) receiving a packer of a particular virtual connection or a packet of other virtual connection, detecting a time interval between a previous packet and the received packet, and setting an arrival time value V of every packet to a previous variable plus the detected time interval;

b) setting an arrival time value R of the packet of the particular virtual connection to the arrival time value V;

c) updating the previous variable with a minimum bandwidth value assigned to the particular virtual connection, the arrival time values V and R and a previous delivery time value F of the packet of the particular virtual connection;

d) updating the previous delivery time value F with the minimum bandwidth value and the arrival time value V;

e) comparing the updated delivery time value F with a decision threshold which is equal to the arrival time value V plus a threshold value assigned to the particular virtual connection;

f) storing the packet of the particular virtual connection into a first-in-first-out buffer if the updated delivery time value F is smaller than the decision threshold and resetting the updated delivery time value F to the previous delivery time value and discarding the packet of the particular virtual connection if the updated delivery time value F is greater than the decision threshold; and g) repeating the steps (a) to (f)

According to a fifth aspect, the present invention provides a method of controlling packets, comprising the steps of:

a) setting an arrival time value V equal to a previous variable plus unity and updating the previous variable with a time interval T which is an integral multiple of a minimum interval between successive packets of any virtual connection;

b) receiving a packet of a particular virtual connection or a packet of other virtual connection and comparing the arrival time value V with a previous arrival time value R of the packet of the particular virtual connection;

c) if the arrival time value V is not equal to the previous arrival time value R, updating the previous variable with a previous delivery time value F of the packet of the particular virtual connection, the arrival time value V weighted by a coefficient assigned to the particular virtual connection and the previous arrival time value R weighted by the coefficient, and setting a current arrival time R of the packet of the particular virtual connection to the arrival time value V;

d) updating the previous delivery time value F with the weighted arrival time value V;

e) if the arrival time V is equal to the previous arrival time value R, repeating the step (d);

f) comparing the updated delivery time value F with a decision threshold which is equal to the weighted arrival time value V plus a threshold value assigned to the particular virtual connection;

g) storing the packet of the virtual connection into a first-in-first-out buffer if the updated delivery time value F is smaller than the decision threshold and resetting the updated delivery time value F to the previous delivery time value and discarding the packet of the particular virtual connection if the updated delivery time value F is greater than the decision threshold; and h) repeating the steps (b) to (g) if a packet arrives; and i) repeating the step (a) at T-intervals.

BRIEF DESCRIPTION OP THE DRAWINGS

The present invention will be described in further detail with reference to the accompanying drawings, in which.

DETAILED DESCRIPTION

Figure 1:
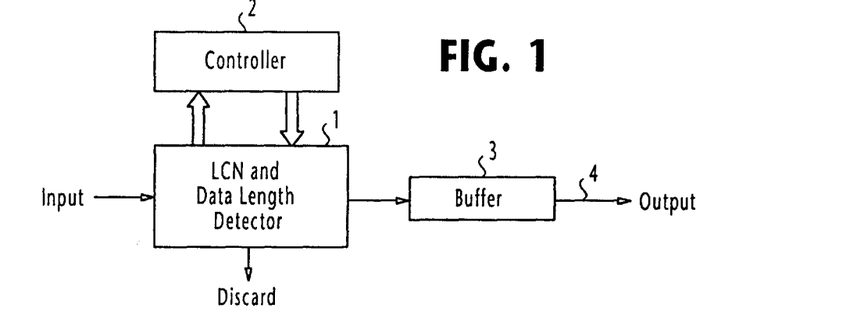
FIG. 1 is a schematic block diagram of a connection-oriented network node according to one embodiment of the present invention.

Referring to FIG. 1, there is shown a connection-oriented network node of a communications system according to one embodiment of the present invention. The network node receives packets of variable length and includes an LCN and data length detector 1 for detecting a virtual connection indicator, or LCN (logical channel number) contained in the header of a received packet as well as its data length "L". The detected information is supplied to a controller 2, which makes a decision on the detected information whether the incoming packer should be discarded or stored into a buffer 3 of first-in-first-out memory. The stored packet is placed at the end of a queue and delivered onto a transmission medium via an output terminal 4.

Figure 2:
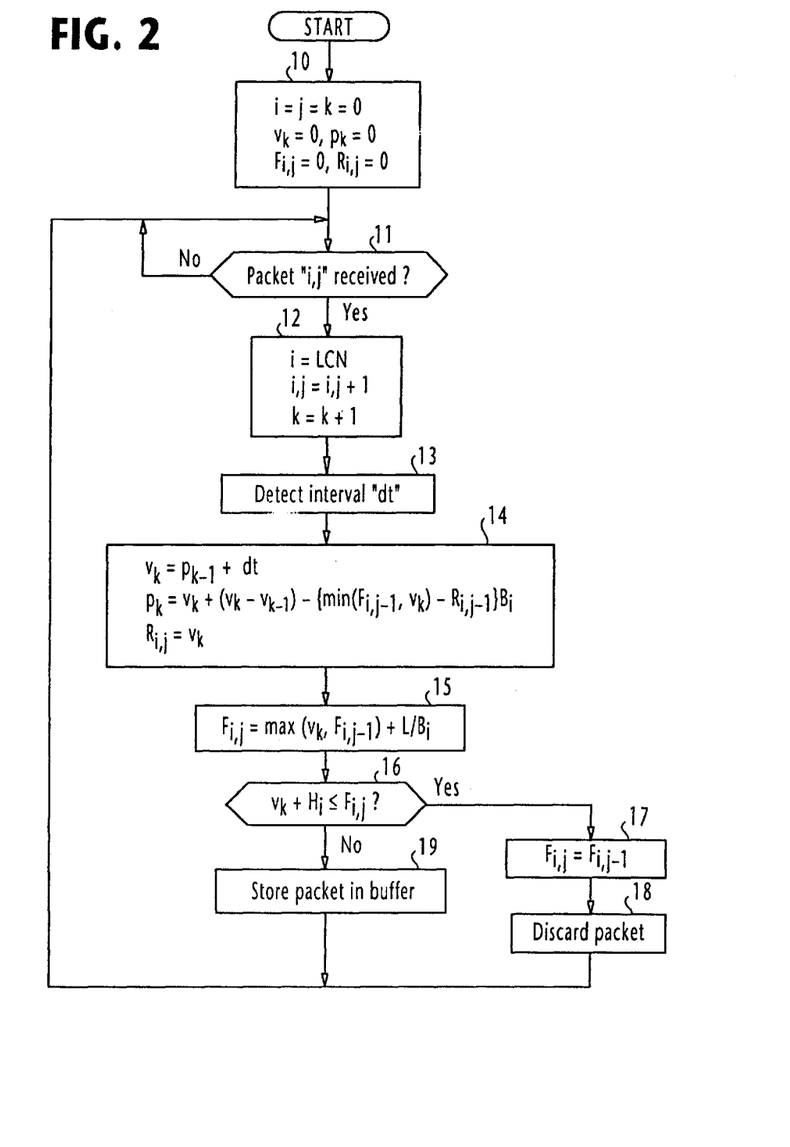
FIG. 2 is a flowchart of the operation of the controller of FIG. 1.

Controller 2 operates according to the flowchart of FIG. 2. The operation of the controller begins with initialization step 10 in which all parameters including i, j, k, $v_k$, $p_k$, $F_{i,j}$ and $R_{i,j}$ are initialized, where i is a virtual connection indicator, "j" is the number of arriving packets of the associated connection and k is the number of arriving packets regardless of their virtual connection. Parameter $v_k$ represents a calculated virtual arrival time of all incoming packets regardless of their connection. As will be described, the virtual arrival time of a packet is advanced with respect to the real arrival time of the packet according to the vacant capacity of the transmission medium. Parameter $p_k$ is a variable, and parameter $R_{i,j}$ represents a virtual arrival time of a packet "j" of connection "i" and parameter $F_{i,j}$ represents a delivery time of this packet from the buffer 3 onto the transmission.

When a packet is received and its LCN is detected at step 11, the controller 2 proceeds to step 12, where it assigns a connection indicator "i" to the detected LCN value of the packet if the connection is first established or selects the assigned connection indicator corresponding to the detected LCN value if the connection is already established. Controller 2 increments a connection-associated packer indicator "i,j" of the connection "i" by one so that the incremented packer indicator is represented as "i,j+1". The connection-dissociated packet indicator "k" is also incremented by one.

At step 13, the controller calculates the interval "dt" between the previous packet and the current packet regardless of their connection, and proceeds to step 14 to determine a virtual arrival time $v_k$ of the current packet and a variable $p_k$ by solving the following equations:

$$v_k = p_{k-1} + dt \tag{1}$$

$$p_k = v_k + (v_k - v_{k-1}) - \{\min(F_{i,j-1}, v_k) - R_{i,j-1}\} B_i \quad (2)$$

$$R_{i,j} = v_k \quad (3)$$

where $B_i$ represents the minimum bandwidth assigned to the connection "i".

It is seen that a variable $p_k$ is obtained by summing the current virtual time $v_k$ with a time lapse of the current virtual time $v_k$ from the previous time $v_{k-1}$, summing this time lapse with the current virtual time $v_k$ to produce an integrated virtual time, subtracting the previous virtual arrival time $R_{i,j-1}$ from a smaller of the previous delivery time $F_{i,j-1}$ and the current virtual time $v_k$ to produce a time difference, weighting the time difference by the minimum bandwidth $B_i$, and subtracting the weighted time difference from the integrated virtual time. Current virtual time $v_k$ is set equal to the sum of previous variable $p_{k-1}$ and the interval "dr". At the same time, the $R_{ij}$ value for the incoming packet is set equal to the current virtual time $v_k$.

At step 15, the controller determines a value $F_{i,j}$ of delivery instant of the packet from the buffer 3 so that vacancy of the transmission medium is reduced to a minimum if the received packet were delivered from either of the buffers onto the transmission medium at the instant of the calculated value. The $F_{i,j}$ value is calculated from a greater of the current virtual arrival time $v_k$ and the previous value of packet delivery time $F_{i,j-1}$ plus a coefficient which varies with the data length L and varies inversely with the minimum bandwidth $B_i$ as follows:

$$F_{i,j} = \max(v_k, F_{i,j-1}) + L/B_i \quad (4)$$

Flow proceeds from step 15 to step 16 to check to see if the following relation holds:

$$v_k + H_i \leq F_{ij} \quad (5)$$

where $H_i$ represents a threshold for discarding packets. If the $F_{i,j}$ is equal to or greater than the sum $(v_k+H_i)$, the decision at step 16 is affirmative and flow proceeds to step 17 to reset the delivery time $F_{ij}$ equal to the previous value $F_{i(j-1)}$ and discard the packet at step 18, and flow returns to step 11 to repeat the process on subsequent packets. If the decision at step 16 is negative, the packet is stored into the buffer 3 at step 19, and flow returns to step 11.

Figure 3:
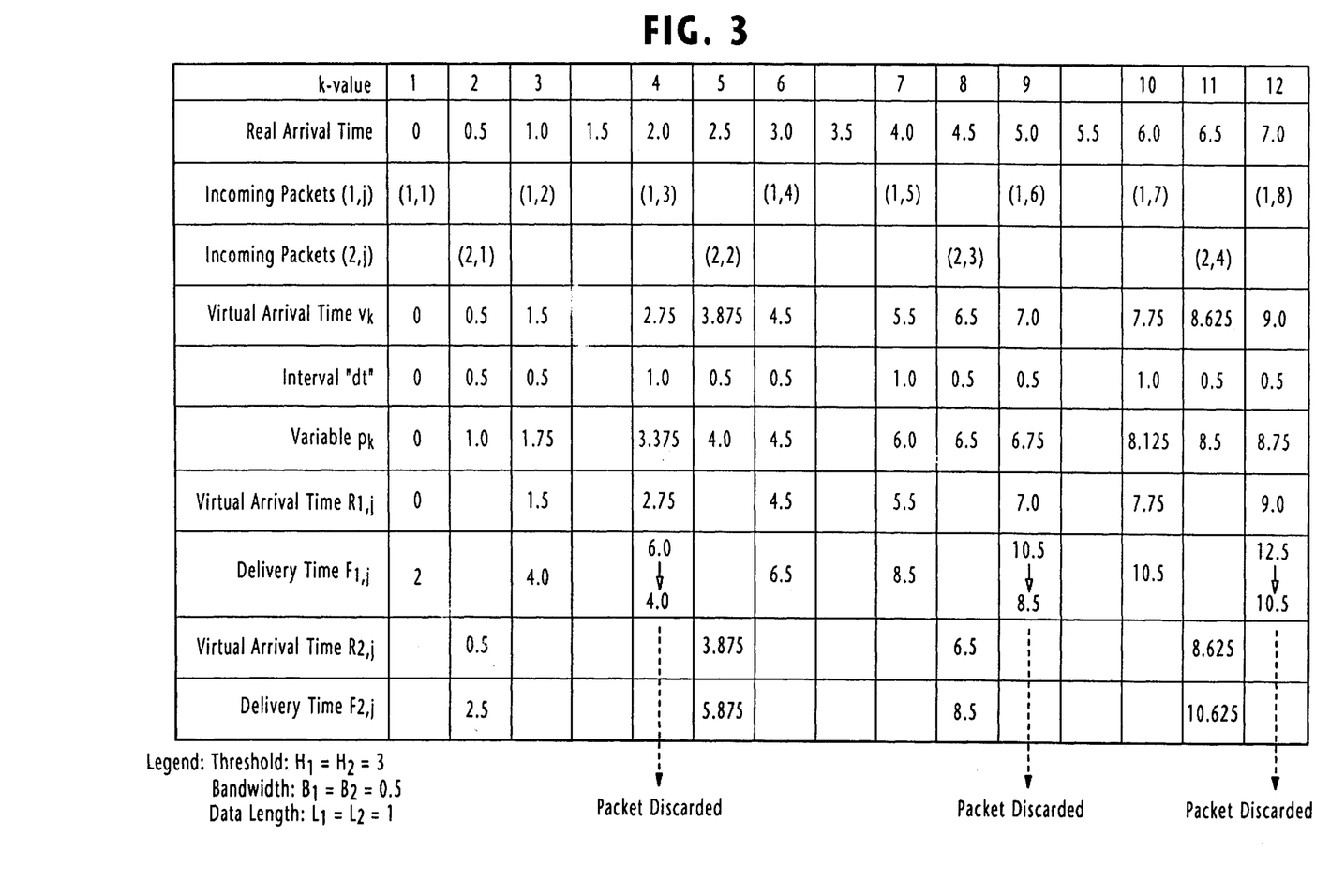
FIG. 3 is a list of parameters of the controller of FIG. 4 when handling packets of two simultaneous connections according to the flowchart of FIG. 2.

The operation of the controller 2 will be best understood with the following description with the aid of FIG. 3 by assuming that connections #1 and #2 are simultaneously established and each connection is assigned a minimum bandwidth $B_1$ of 0.5, all packets are of the same data length of L =1, and that the threshold $H_i$ of each connection is "3". It is further assumed that packets on connection #1 are arriving at a rate twice the assigned minimum bandwidth and packets of connection #2 are arriving at a rate conforming to its assigned minimum bandwidth. Therefore, packets (1,j) of connection #1 arrive at real time instants "0", "1", "2", "3", "4", "5", "6" and "7", while packets (2,j) of connection #2 arrive at real time instants "0.5", "2.5", "4.5" and "6.5".

At real time 0 (k=1), a delivery time $F_{1,0}$ of 2 (=L/$B_1$=1/0.5=2) is obtained for a packet (1,1) and all other parameters are zero.

At real time 0.5 (k=2), a virtual arrival time $v_2$ of 0.5 (=$p_1$+dt=0 +0.5) is obtained for a packet (2,1) from Equation (1) and a variable $p_2$ of 1.0 (=$v_1$+$v_1$-$v_0$-{min ($F_{2,0}$, $v_1$)-$R_{2,0}$}×0.5=0.5+0.5-0-|min (0, 0)-0}×0.5) is obtained from Equation (2).

At real time 1.0 (k=3), a virtual arrival time $v_3$ of 1.5 (=$p_2$+dt=1.0 +0.5) is obtained for a packet (1,2) and a variable $p_3$ of 1.75 (=$v_3$+$v_3$-$v_2$-{min ($F_{1,1}$, $v_3$)-$R_{1,2}$}×0.5= 1.5+1.5-0.5-{min (2, 1.5)-0}×0.5=2.5-0.75) is obtained from Equation (2). Additionally, a delivery time $F_{1,2}$ of 4.0 (=max ($v_3$, $F_{1,1}$)+L/$B_1$=2+2) is obtained according to Equation (4).

At real time 2.0 (k=4), a virtual arrival time $v_4$ of 2.75 (=$p_3$+dt=1.75+1.0) is obtained for a packet (1,3) and a variable $p_4$ of 3.375 (=$v_4$+$v_4$-$v_3$-{min ($F_{1,2}$,$v_4$)-$R_{1,2}$}×0.5= 2.75+2.75-1.5-{min (4.0, 2.75)-1.5}×0.5=4.0-0.625) is obtained from Equation (2). Therefore, a delivery time $F_{1,3}$ of 6.0 (=max ($v_4$, $F_{1,2}$)+L/$B_1$=4.0+2) is initially obtained according to Equation (4). However, this delivery time $F_{1,3}$ is determined to be greater than the sum $v_5$+$T_1$ (=2.75+3= 5.75) at step 16, it is reset to the previous value of 4.0 at step 17 and the packet (1,3) is discarded (step 18).

In a similar manner, when a packet (1,6) arrives at time 5.0 (k=9), the virtual arrival time $v_9$ is advanced to 7.0 and the delivery time $F_{1,6}$ is initially updated to 10.5, but reset to the previous value of 8.5 since the updated value is greater than the sum $v_9$+$H_1$ (=7.0+3=10.0), and hence the packet (1,6) is discarded. When a packet (1,8) arrives at time 7.0 (k=12), the virtual arrival time $v_{12}$ is advanced to 9.0 and the delivery time $F_{1,8}$ is initially updated to 12.5, but reset to the previous value of 10.5 because the updated value is greater than the sum $v_{12}$+$H_1$ (=9.0+3=12.0), and hence the packet (1,8) is discarded.

It is seen that the minimum bandwidth of 0.5 is guaranteed for both connections even though the packet arrival rate of connection #1 is twice its assigned minimum bandwidth.

While mention has been made of connections for distinguishing packets, a group of connections could equally be used for treating it as a unit in a way different from other groups of connections. Such a group may be a service class or a class of same priority. In such instances, the LCN detector I examines the particular field of each arriving packet that indicates the intended class and the controller 2 sets the detected class to the parameter "i", instead of connection.

A modified embodiment of the controller 2 of the present invention is shown in FIGS. 4, 5A, 5B and 6. In this modification, integral numbers are used for the parameter values, instead of the previously used fractional numbers, for ease of implementation. Additionally, incoming packets are of fixed data length such as 53-byte ATM cells.

Figure 4:
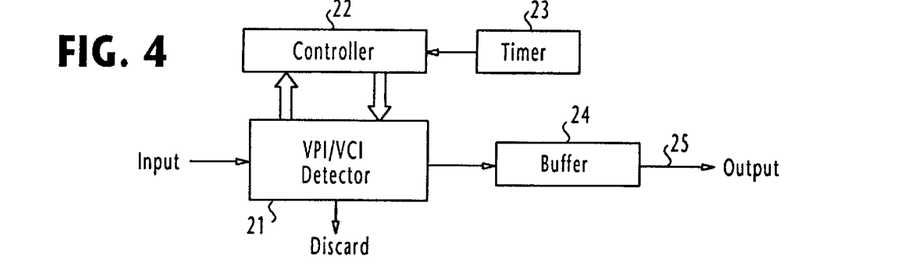
FIG. 4 is a schematic block diagram of a connection-oriented network node according to a modified embodiment of the present invention.

As illustrated in FIG. 4, the network node is an ATM node including a VPI/VCI detector 21, a controller 22 and a timer 23 which supplies a timer interrupt command to the controller 22 at intervals "T". Detector 21 performs detection of a VPI/VCI value contained in the header of a received ATM cell and notifies the controller 22 of the detected VPI/NCI information, which operates according to the flowchart of FIGS. 5A and 5B.

Figures 5A, 5B:
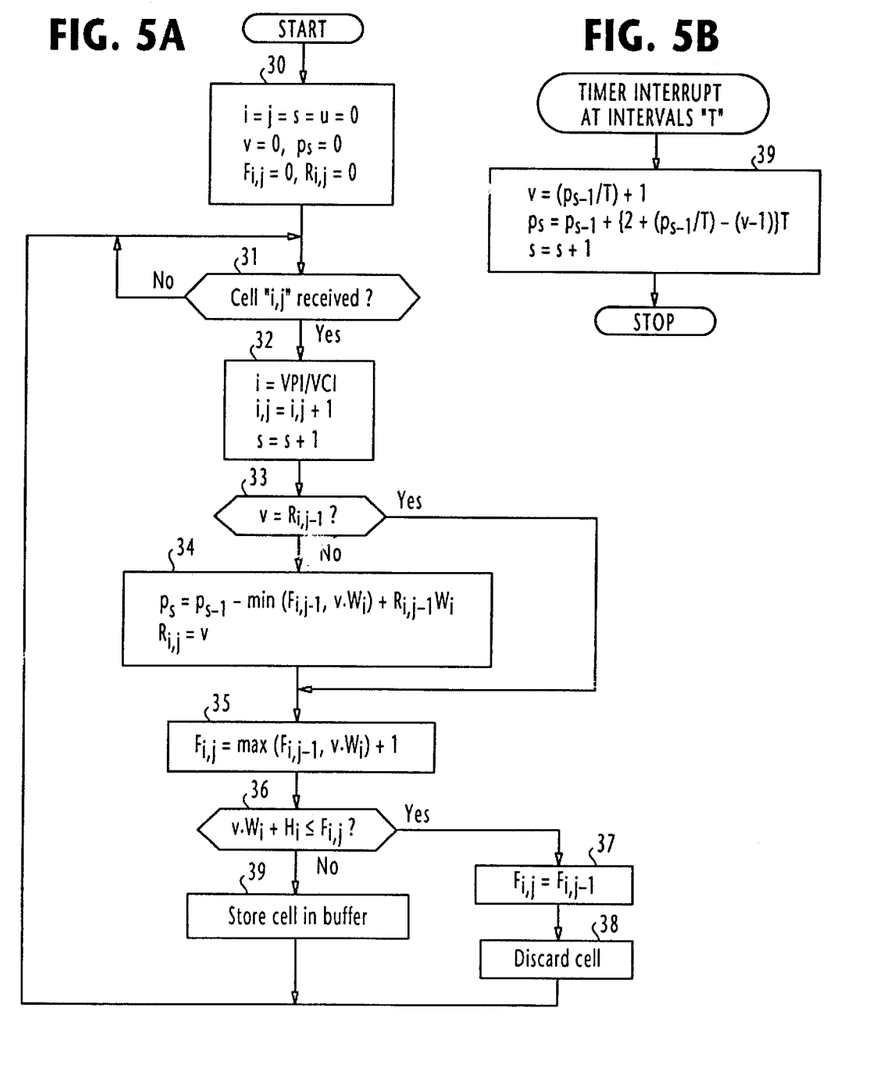
FIGS. 5A and 5B are flowcharts of the operation of the controller of FIG. 4 according to one form of the invention.

In FIG. 5A, the operation of the controller 22 begins with initialization step 30 in which parameters i, j, s, v, $p_s$, $F_{i,j}$ and $R_{i,j}$ are initialized to zero, where "s" represents the number of unit (minimum) intervals (=0.5), "v" represents virtual arrival time which is updated by a routine shown in FIG. 5B which is initiated by the timer 23 and "$P_s$" represents a variable which is updated together with the virtual arrival time "v" during the update routine.

When the VPI/VCI value of an incoming cell is detected at step 31, the controller proceeds to step 32 to assign a connection identifier "i" if the connection is first established or selects the assigned connection indicator corresponding to the detected VPI/VCI value if the connection is already established in a manner similar to the previous embodiment. Controller 22 increments a connection-associated cell indicator "i,j" of the connection "i" by one so that the incremented cell indicator is represented as "i,j+1". The unit-interval count "s" is also incremented by one at step 32.

Exit then is to decision step 33 to determine whether virtual arrival time "v" is equal to previous virtual arrival time $R_{i,j-1}$. If so, flow proceeds to step 35. Otherwise, it proceeds to step 34 to calculate the following equations to obtain a variable $p_s$ and a virtual arrival time value $R_{i,j}$:

$$p_s = p_{s-1} - \min(F_{i,j-1}, v \cdot W_i) + R_{i,j-1} \} \cdot W_i \quad (6)$$

$$R_{i,j} = v \quad (7)$$

where $W_i$ is a "weight coefficient" assigned to the connection "i". This weight assumes an integral number. The minimum bandwidth of connection "i" is given by the relation $W_i/T$, where T is the interval between successive timer interrupt routines.

Flow proceeds to step 35 where the controller solves the following equation to determine a delivery time $F_{i,j}$:

$$F_{i,j} = \max(F_{i,j-1}, v \cdot W_i) + 1 \quad (8)$$

At step 36, the controller 22 checks to see if the following relation holds:

$$v \cdot W_i + H_i \leq F_{ij} \quad (9)$$

If $F_{i,j}$ is equal to or greater than the sum $(v \cdot W_i + H_i)$, the decision at step 36 is affirmative and flow proceeds to step 37 to reset the delivery time $F_{ij}$ equal to the previous value $F_{i(j-1)}$ and discard the cell at step 38, and flow returns to step 31 to repeat the process on subsequent cells. If the decision at step 36 is negative, the cell is stored into the buffer 3 at step 39, and flow returns to step 31.

As illustrated in FIG. 5B, a timer interrupt routine is initiated at intervals T to update "v" and "$p_s$" as follows:

$$p_s = p_{s-1} + \{2 + (p_{s-1}/T) - (v-1)\}T \quad (10)$$

$$v = (p_{s-1}/T) + 1 \quad (11)$$

At the same time, the parameter "s" is incremented by one.

Figure 6:
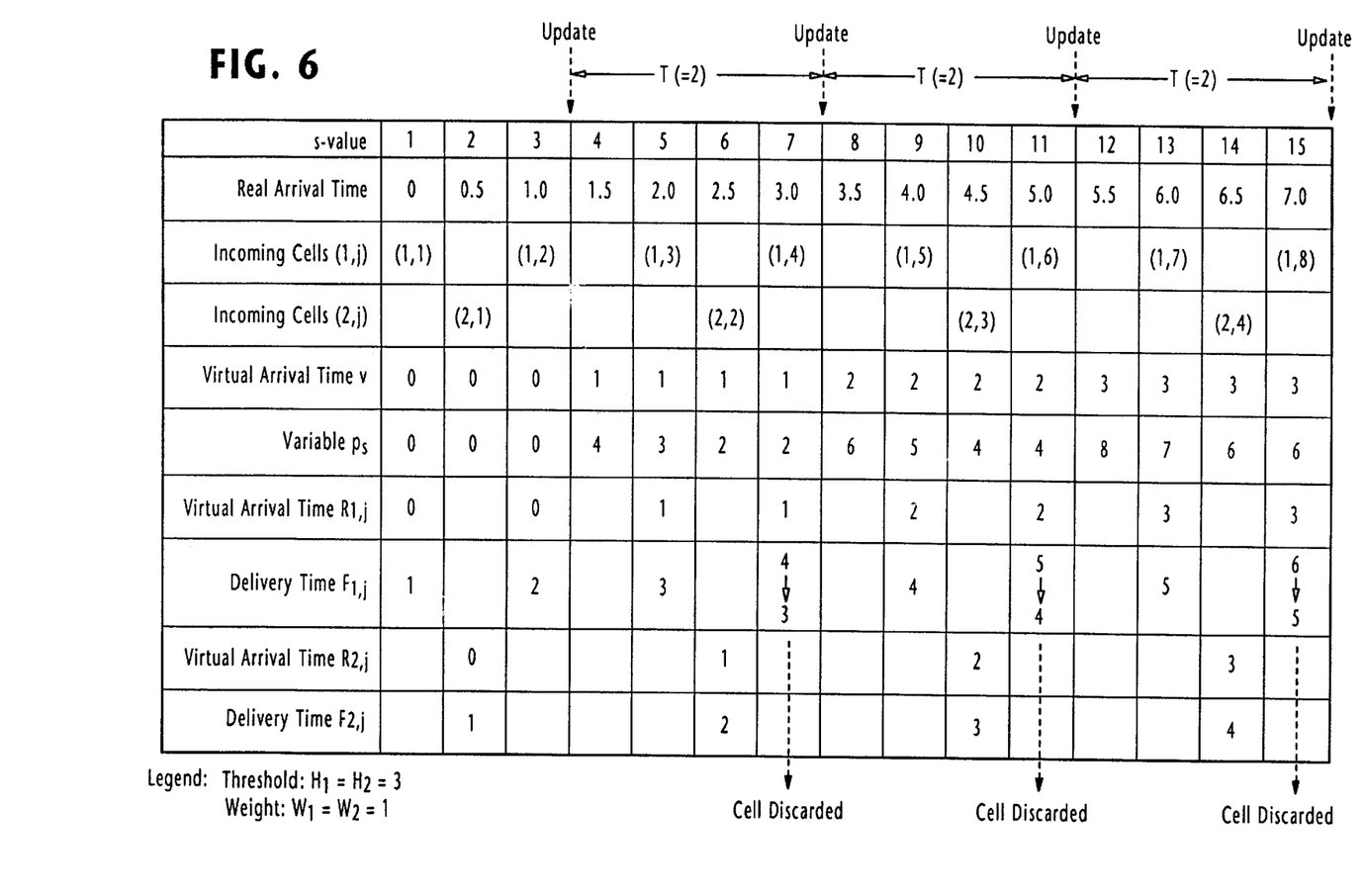
FIG. 6 is a list of parameters of the controller of FIG. 4 when handling ATM cells of two simultaneous connections according to the flowcharts of FIGS. 5A and 5B.

The operation of the controller 22 according to the flowcharts of FIGS. 5A and 5B will be best understood with the following description with the aid of FIG. 6 by assuming that connections #1 and #2 are simultaneously established and each connection is assigned a minimum bandwidth of 0.5 and a weight value $W_i$ of 1, and that the threshold $H_i$ of each connection is "3". It is further assumed that the timer interrupt interval T is equal to 2 which is four times the unit interval of 0.5 and that cells on connection #1 are arriving at a rate twice the assigned minimum bandwidth and cells of connection #2 are arriving at a rate conforming to its assigned minimum bandwidth in the same manner as the packets of FIG. 3.

At real time 0 (s=1), a delivery time $F_{1,1}$ equal to "1" is obtained from Equation (8) at: step 34 for an incoming cell (1,1) since v (=0) is equal to $R_{1,0}$ (=0) at step 33.

At real time 0.5 (s=2), a delivery time $F_{2,1}$ equal to "1" is similarly obtained for a cell (2,1) since v (=0) is equal to $R_{2,0}$ (=0) at step 33.

At real time 1.0 (s=3), a delivery time $F_{1,2}$ equal to "2" is obtained for a cell (1,2) since v (=0) is equal to $R_{1,1}$ (=0) at step 33.

At real time 1.5 (s=4), a timer interrupt occurs and the variable is updated to $p_4$ as equal to "4" (=$p_3 + \{2 + (p_3/T) - v_0\}T = 0 + \{2 + 0/2 -\} \times 2$) and the virtual time "v" is updated to "1" (=$(p_3/2) + 1$).

At real times 2,0 (s=5) and 2.5 (s=6), since $v_1$ is not equal to $R_{1,3}$ nor $R_{2,2}$, step 34 is executed to solve Equation (6) to obtain variables $p_5$ and $p_6$ respectively for cells (1,3) and (2,2) as follows:

$p_5 = p_4 - \min(F_{1,2}, v \times 1) + R_{1,2} \times 1 = 4 - \min(2, 1) + 0 \times 1 = 3$ $P_6 = p_5 - \min(F_{2,1}, v \times 1) + R_{2,1} \times 1 = 3 - \min(1, 1) + 0 \times 1 = 2$ Virtual arrival times $R_{1,3}$ and $R_{2,2}$ are set equal to the v=1 at step 34 and delivery times $F_{1,3}=3$ and $F_{2,2}=2$ are obtained at step 35.

All of these incoming cells are stored into the buffer 3 because each of their $F_{i,j}$ values is smaller than the decision threshold $v \cdot W_i + H_i$.

At real time 3.0 (s=7), v is equal to $R_{1,4}$ for a cell (1,4), step 34 is skipped and step 35 is executed, giving $F_{1,4} = 4$ (=$\max(F_{1,3}, v \cdot W_1) + 1$). Since $F_{1,4}$ is equal to the decision threshold value $v \cdot W_1 + H_1$ (=4) at step 36, $F_{1,4}$ is reset to the previous value "3" and the cell (1,4) is discarded.

At real time 3.5 (s=8), a second timer interrupt occurs and the variable is updated $p_8 = 6$ (=$p_7 + \{2 + (p_7/T) - v_1\}T = 2 + \{2 + 2/2 - 1\}2$) and the virtual arrival time is updated as $v_2 = 2$ (=$(p_7/2) + 1$).

In a similar manner, cells (1,6) and (1,8) are discarded at step 38, since their $F_{1,6}$ and $F_{1,8}$ values are initially equal to the decision threshold values of "5" and "6" respectively (step 36) and then reset to their previous values of "4" and "5" (step 37).

Figures 7A, 7B:
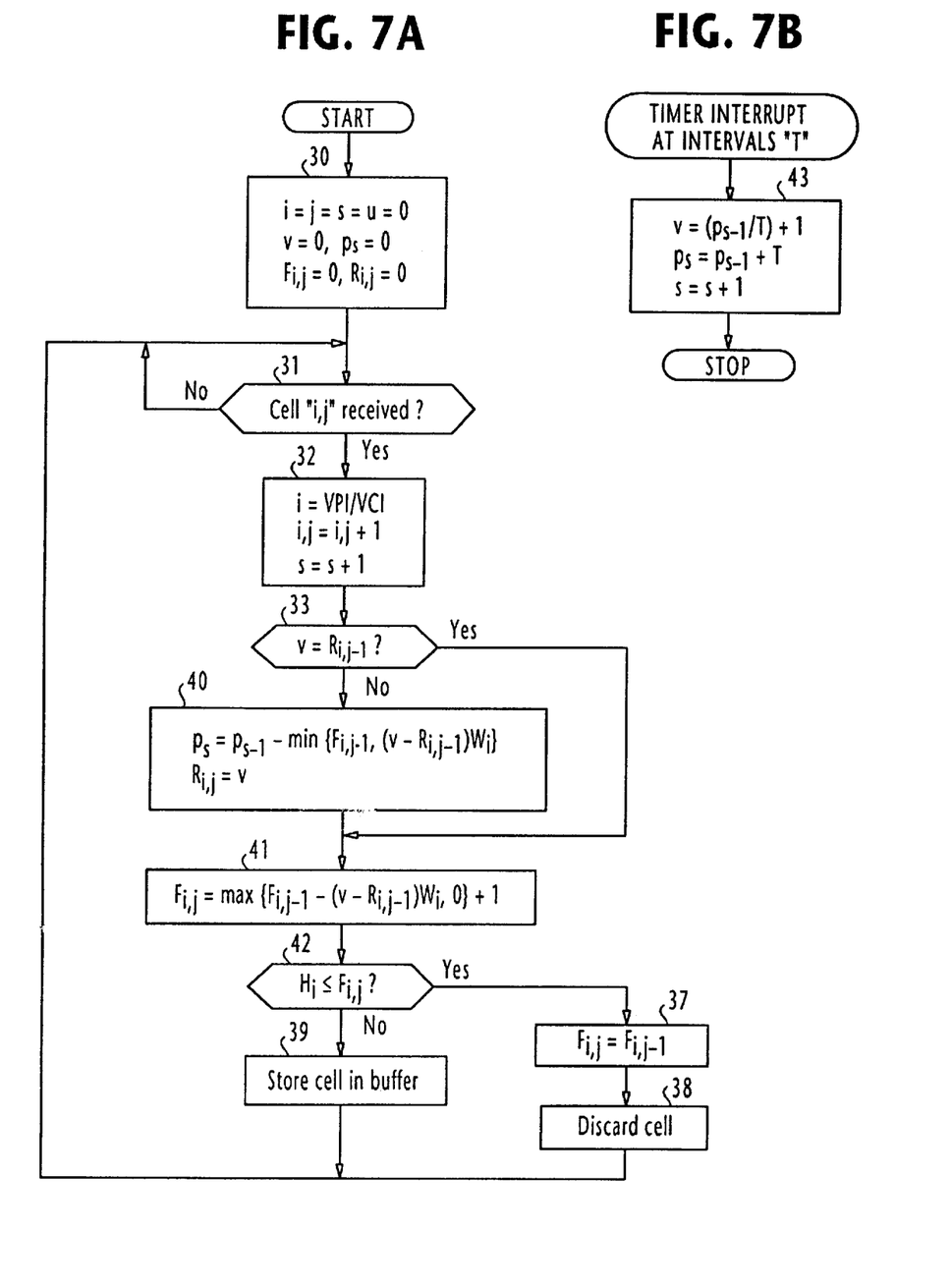
FIGS. 7A and 7B are flowcharts of the operation of the controller of FIG. 4 according to a modified form of the invention.

FIGS. 7A and 7B are flowcharts of the operation of controller 22 according to a modified form of the invention. In this modification, the calculation of the virtual time "v" is simplified and the ranges of $F_{i,j}$ and $p_s$ values are advantageously reduced for implementation. In FIG. 7A, steps 40 to 42 are used instead of steps 34 to 36 of FIG. 5A, and in FIG. 7B, step 43 is used instead of step 39 of FIG. 5B.

At step 40, the controller 22 solves the following equations to obtain a $p_s$ value and an $R_{i,j}$ values for an incoming cell:

$$p_s = p_{s-1} - \min\{F_{i,j-1}, (v \cdot R_{i,j-1})W_i\} \quad (12)$$

$$R_{i,j} = v \quad (13)$$

Controller 22 proceeds to step 41 to calculate the following equation:

$$F_{i,j} = \max\{F_{i,j-1} - (v - R_{i,j-1})W_i, 0\} + 1 \quad (14)$$

At step 42, the controller 22 compares the $F_{i,j}$ value with the threshold $H_i$. If $F_{i,j}$ is equal to or greater than $H_i$, flow proceeds from step 42 to step 37 to reset $F_{i,j}$ to the previous value and discards the cell (i,j) at step 38. If $F_{i,j}$ is smaller than $H_i$, flow proceeds to step 39 to store the cell in the buffer 24.

During the timer interrupt routine (FIG. 7B), the v and $p_s$ values are updated as follows, $$v = (p_{-1}/T) + 1 \quad (15)$$

$$p_s = p_{s-1} + T \quad (16)$$

and parameter "s" is incremented by one.

Figure 8:
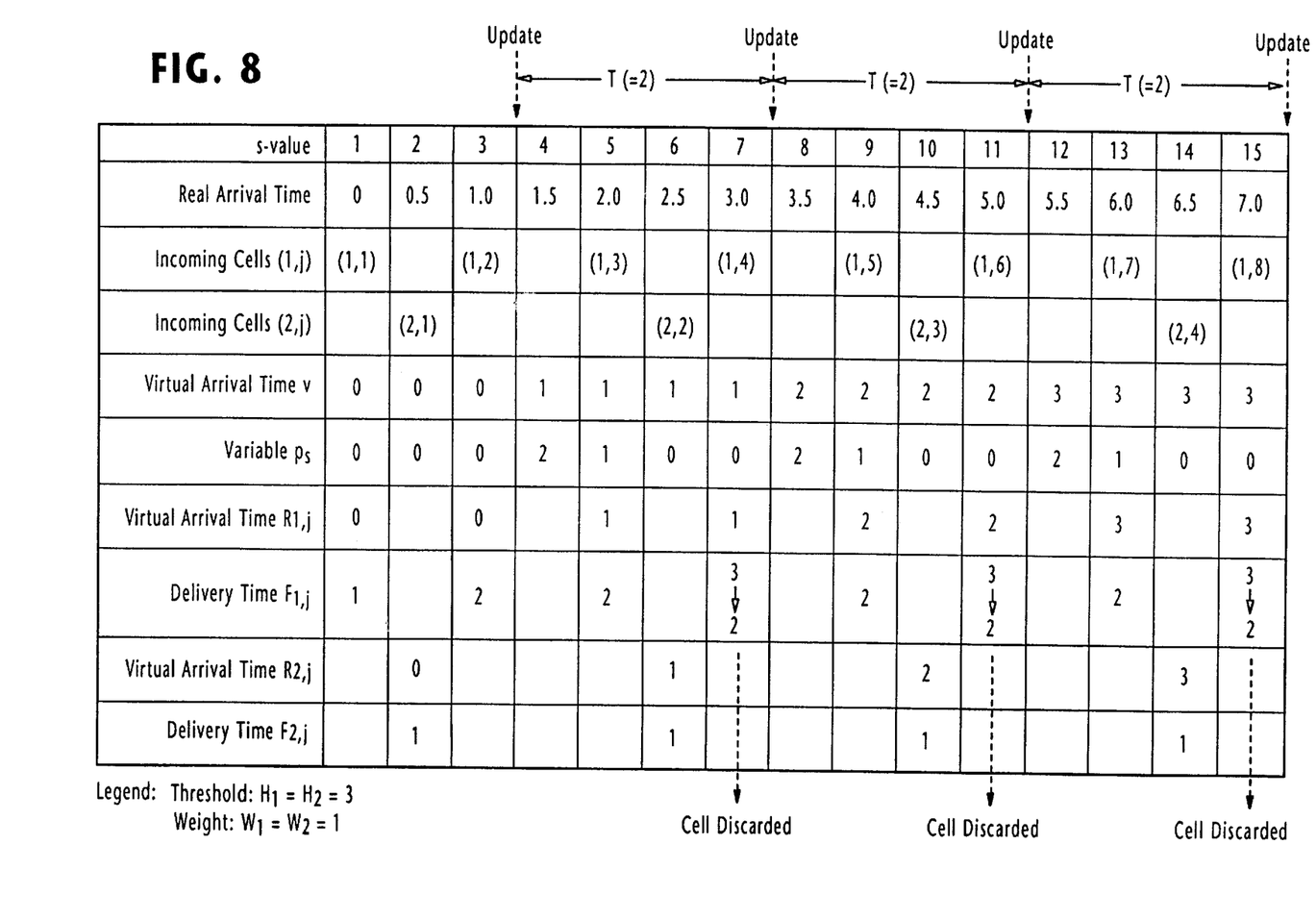
FIG. 8 is a list of parameters of the controller of FIG. 4 when handling ATM cells of two simultaneous connections according to the flowcharts of FIGS. 7A and 7B.

It is seen from FIG. 8 that when the controller 22 operates according to the flowcharts of FIGS. 7A and 7B under the same conditions as those of FIG. 6, the $F_{i,j}$ and $p_s$ values vary in smaller ranges as compared with FIG. 6.

Figure 9:
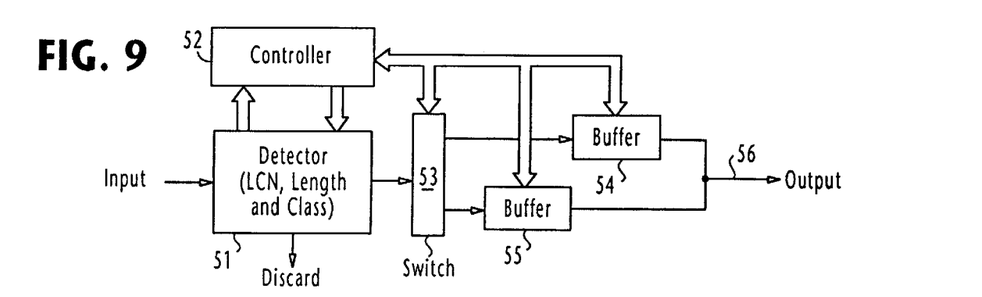
FIG. 9 is a schematic block diagram of a connection-oriented network node according to a further modification of the present invention.

A modified embodiment of FIG. 1 is shown in FIG. 9. In this modification, packets of different priority classes are received. Detector 51 detects the LCN, the data length and the class of a received packet and informs the controller 52 of the detected information. A switch 53 is connected to the detector 51 to selectively supply the packet to a class-1 (high priority) buffer 54 and a class-2 (low priority) buffer 55 in response to a control signal from the controller 52. Packets stored in the class-1 buffer 54 is delivered to the output terminal 56 with priority over packets stored in the class-2 buffer 55.

Figures 10A, 10B:
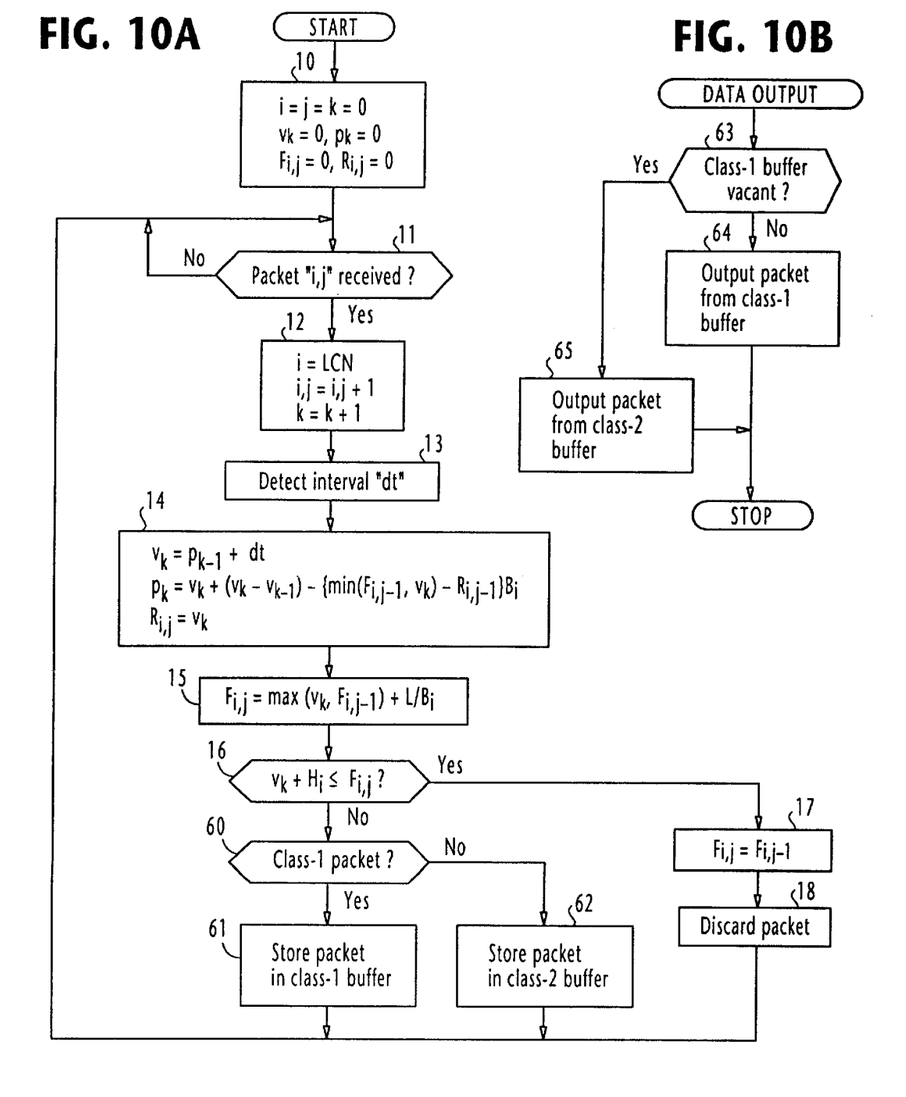
FIGS. 10A and 10B are flowcharts of the operation of the controller of FIG. 9.

The flowcharts of FIGS. 10A and 10B illustrate the operation of the controller 52. The operation of the controller in FIG. 10A proceeds in the same manner as that of the flowchart of FIG. 2 until flow exits step 16, yielding a negative decision Following this decision, flow proceeds to step 60, where the controller 52 determines if the incoming packet is a class-1 packet. If the decision is affirmative, flow proceeds from step 60 to step 61 to cause the switch 53 to store the packet into the class-1 buffer 54. Otherwise, the controller 52 causes the switch 53 to store the packet into the class-2 buffer 55. During a data output routine (FIG. 10B), the controller 52 examines the storage level of the class-1 buffer 54 (step 63). If it is not vacant, the controller directs the class-1 buffer to output packers to the output terminal 56 (step 64). If the class-1 buffer 54 is vacant, the controller directs the class-2 buffer to forward its packets to the output terminal 56 (step 65). The delay time associated with high priority packets is reduced in this way, while ensuring minimum bandwidth of each connection. The priority feature of this embodiment can also be combined with ocher embodiments of the present invention.

Figure 11:
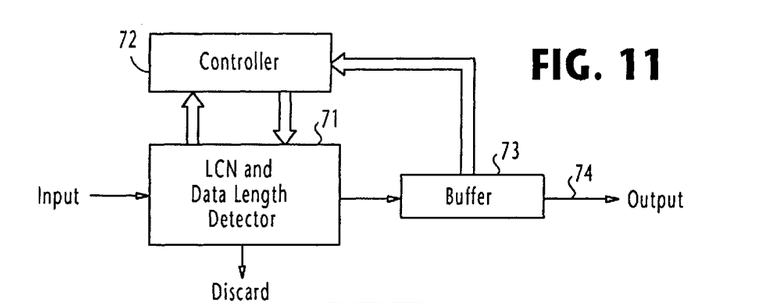
FIG. 11 is a schematic block diagram of a connection-oriented network node according to a further modification of the present invention.

The embodiment of FIG. 1 is further modified as shown in FIG. 11, in which the controller 72 constantly monitors the queue length of packets stored in the buffer 73, while discarding packets from the detector 71 in the same manner as the-controller of FIG. 1. If the queue length of the stored packets exceeds a threshold level, the controller 72 identifies a connection that is the probable cause of the congestion and temporarily restricts the bandwidth assigned to this connection.

Figure 12:
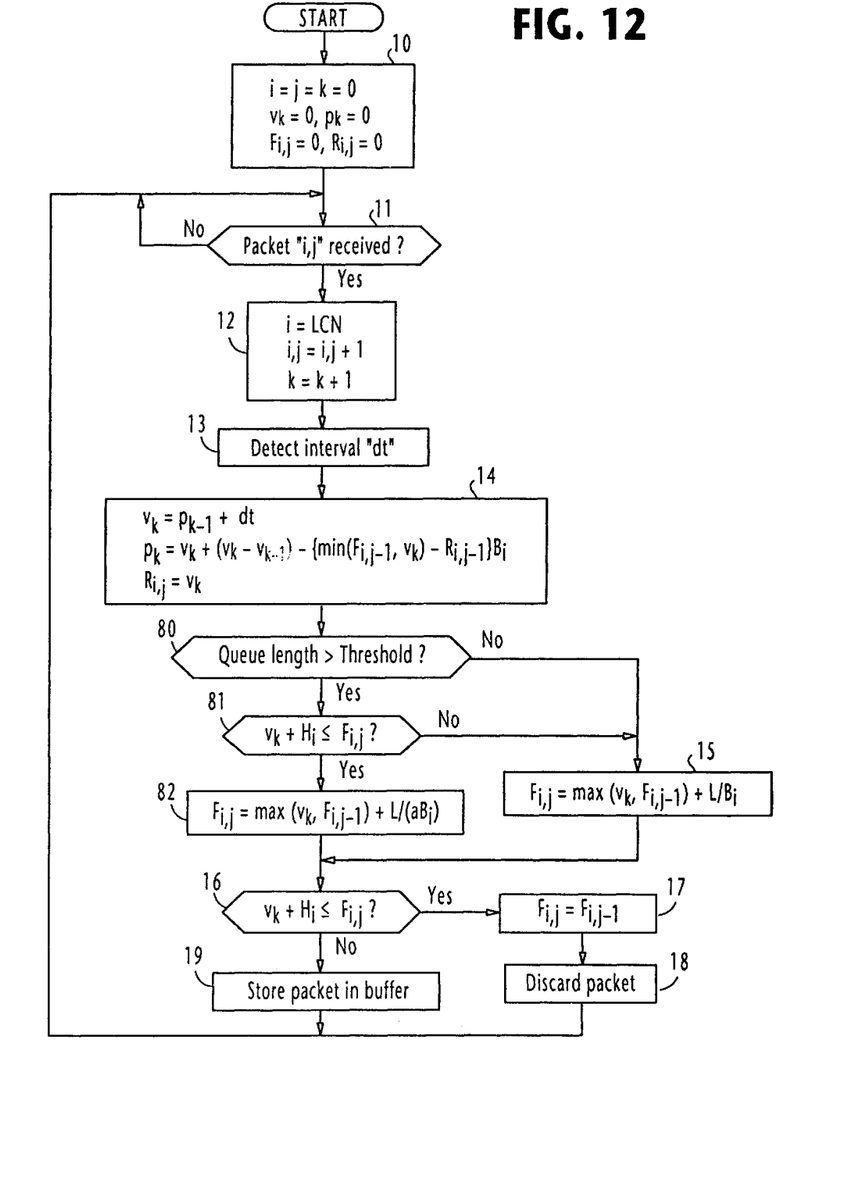
FIG. 12 is a flowchart of the operation of the controller of FIG. 12 according to one form of the present invention.

The flowchart of FIG. 12 illustrates the operation of the controller 72, which proceeds in the same manner as that of the flowchart of FIG. 2 until flow exits step 14. Following step 14, flow proceeds to step 80 to determine whether the queue length of packets in buffer 73 exceeds the threshold. If not, control proceeds from step 80 to step 15 to determine the $F_{i,j}$ value according to Equation (4) described above and proceeds to step 16. If the decision at step 80 is affirmative, flow advances to step 81 to check to see if the $F_{i,j}$ value exceeds the decision threshold value $v_k+H_i$. If not, flow proceeds to step 15. If the decision is affirmative at step 81, packets of the current connection are suspected of being the cause of the congestion, and flow proceeds to step 82 to scale up the $F_{i,j}$ value by narrowing the assigned bandwidth $B_i$ according to the following equation:

$$F_{i,j} = \max(v_k, F_{i,j-1}) + L/(a \cdot B_i) \quad (17)$$

where "a" is a limiting factor in the range between 0 and 1. Therefore, a larger value of $F_{i,j}$ is obtained for packets of high rate traffic than the $F_{i,j}$ value for packets of low rate traffic with the result that the former has, at step 16, a high probability of exceeding the discarding level of $v_k+H_i$.

Figure 13:
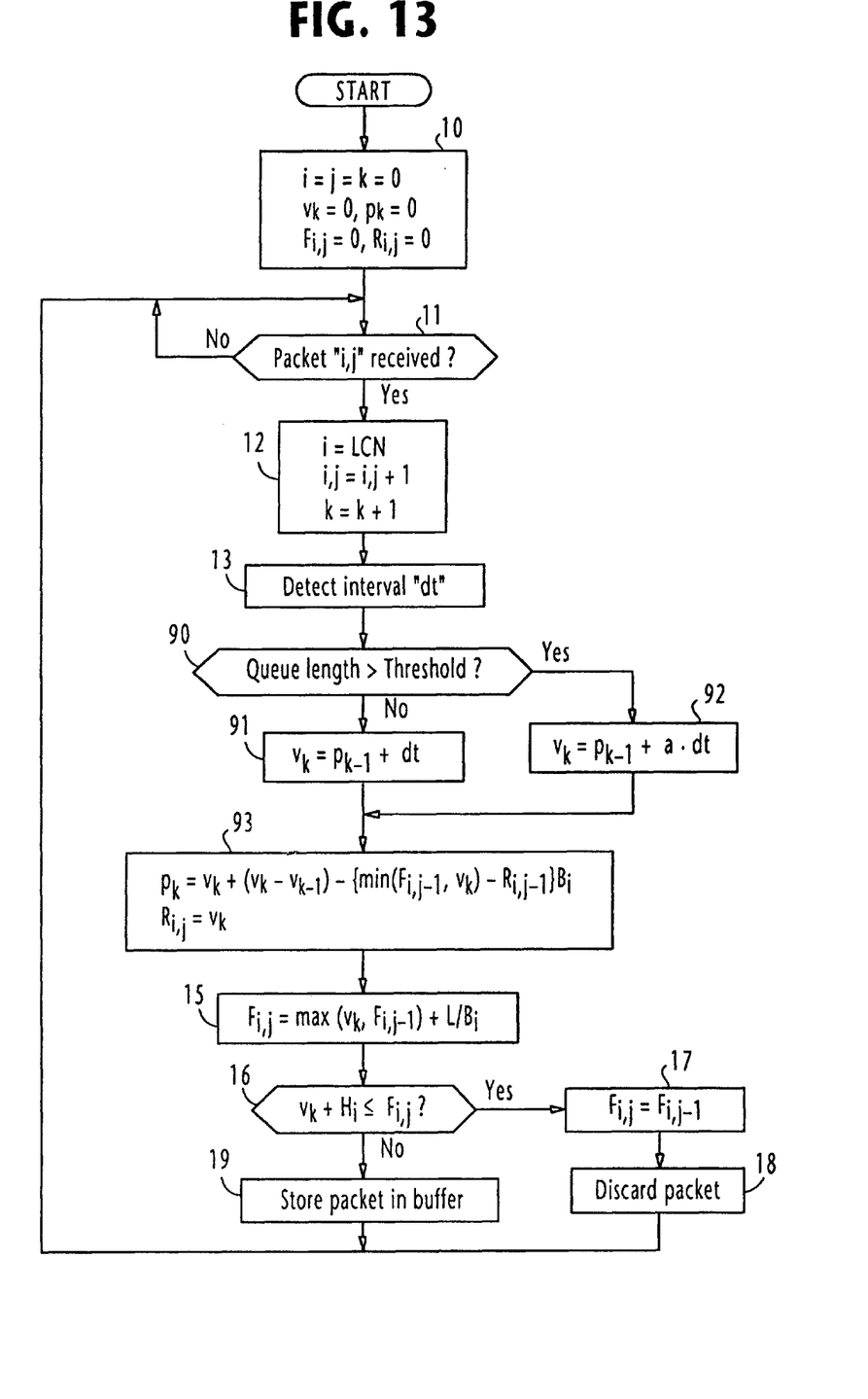
FIG. 13 is a flowchart of the operation of the controller of FIG. 12 according to a modified form of the invention.

Instead of reducing the $F_{i,j}$ value for high rate traffic, the elapse of virtual arrival time $v_k$ may be lagged by the limiting factor "a" to lower the discarding threshold level for high rate traffic. This is illustrated in the flowchart of FIG. 13 which is similar to the flowchart of FIG. 2 until flow exits step 13. At step 90, the controller 72 determines whether the queue length of packets in buffer 73 exceeds the threshold. If not, flow proceeds to step 91 to calculate the virtual arrival time $v_k=p_{k-1}+dt$ according to Equation (1). If the decision at step 90 is affirmative, flow proceeds to step 92 to produce a reduced $v_k$ value as follows:

$$v_k = p_{k-1} + a \cdot dt \quad (18)$$

Step 93 is executed following steps 91 and 92 to solve Equations (2) and (3). Step 15 is then executed to determine the $F_{i,j}$ value, which is compared with the discarding threshold (step 16). The threshold level $v_k+H_i$ is thus reduced when high-traffic packets, are arriving to increase the number of packets to be discarded.

If a large number of connections are to be transported by a single node, the amount of memory necessary for the storage of the connection-associated data such as $R_{i,j}$ and $F_{i,j}$ increases. Since the amount of hardware that can be integrated on a single LSI chip is limited, the number of connections would have to be limited if the memory were to be integrated on the same LSI chip with other circuits. In order to increase the transport capability of network nodes, it is desirable to implement a connection memory outside of the LSI chip as indicated by numeral 100 in FIG. 14 for storing the $R_{i,j}$ and $F_{i,j}$ data of all established connections.

Figure 14:
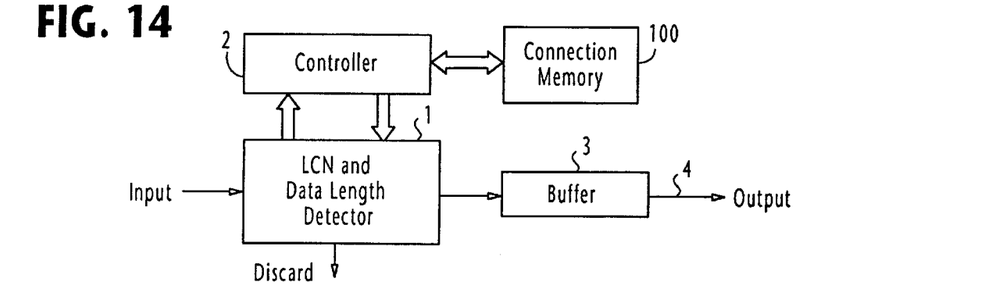
FIG. 14 is a schematic block diagram of a connection-oriented network node according to a still further modification of the present invention.
Figure 15:
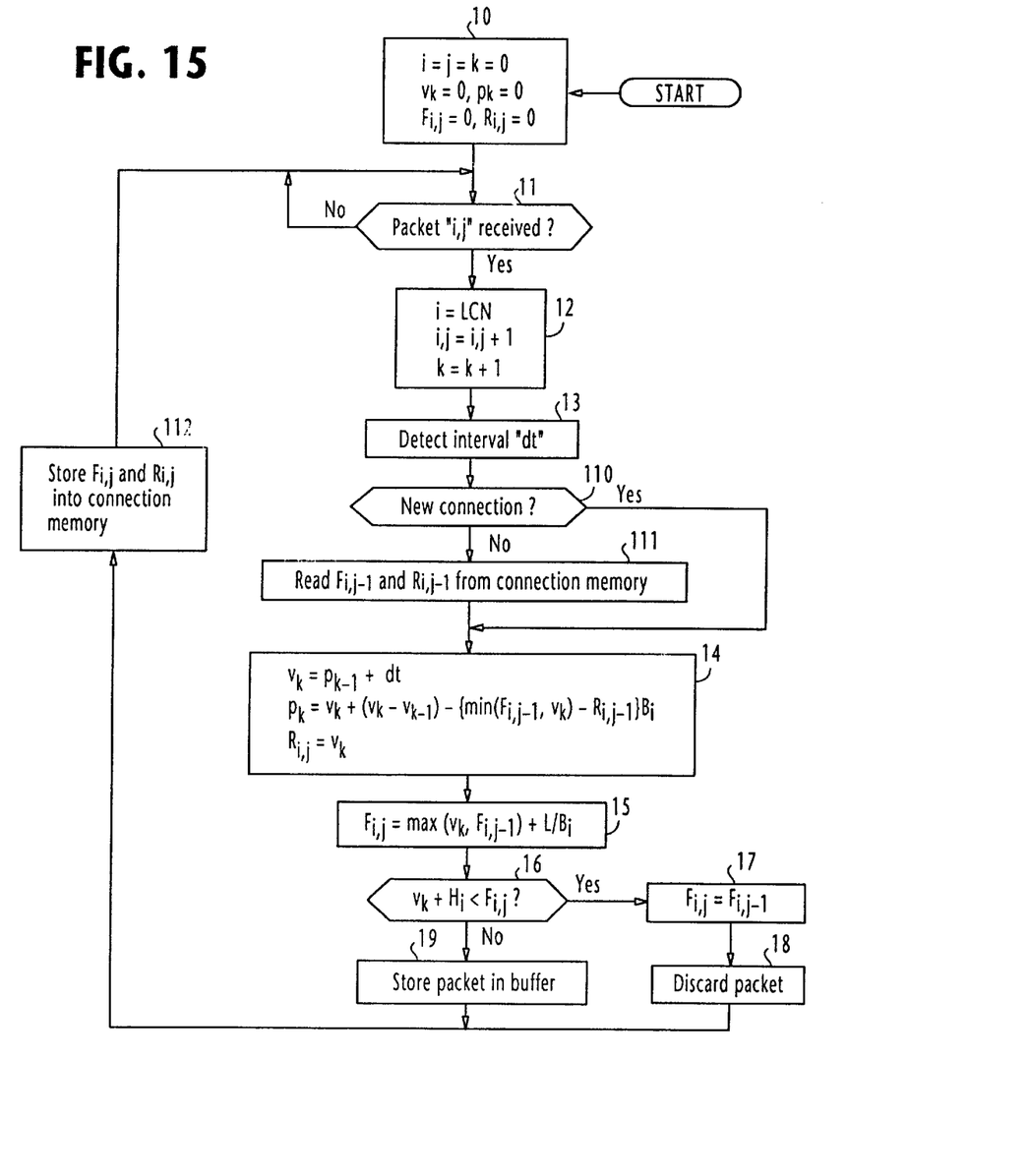
FIG. 15 is a flowchart of the operation of the controller of FIG. 14.

FIG. 15 is a flowchart of the operation of the controller 2 of FIG. 14. This flowchart is similar to the flowchart of FIG. 2 except that steps 110, 111 and 112 are provided. Step 110 is executed, following step 13, to check to see if the connection is one that is newly established. If so, control proceeds from step 110 to step 14 to obtain $v_k$, $p_k$ and $R_{i,j}$ using the values initialized at step 10. If the connection is one that is already established, the controller 2 proceeds from step 110 to step 111 to read the $R_{i,j-1}$ and $F_{i,j-1}$ values from the connection memory 100 and uses these values at steps 14 and 15. After executing steps 18 and 19, the controller 2 proceeds to step 112 to store the current values $R_{i,j}$ and $F_{i,j}$ into the connection memory 100 and then returns to step 11. The stored values of a connection will be read from the connection memory at step 111 to be used at steps 14 and 15 when a subsequent packet of that connection arrives.

What is claimed is:

1. A network node comprising:

a first-in-first-out buffer connected to a transmission medium;

detection circuitry for receiving an incoming packet and detecting a virtual connection of the received packet; and control circuitry for calculating a value of delivery instant according to a minimum bandwidth assigned to the detected virtual connection so that vacancy of said transmission medium is reduced to a minimum if the received packet were delivered from said buffer onto said transmission medium at the instant of the calculated value, comparing the calculated value with a decision threshold assigned to the detected virtual connection, storing the received packet into said buffer if the calculated value is smaller than the decision threshold, and discarding the received packet if the calculated value is greater than the decision threshold.

2. The network node of claim 1, wherein said control circuitry is arranged to calculate said value according to a data length of the received packet.

3. The network node of claim 1, wherein said control circuitry is arranged to calculate said value according to a weight coefficient assigned to the detected virtual connection.

4. The network node of claim 1, wherein said control circuitry is arranged to:

monitor a queue length of packets stored in said buffer; and decrease said assigned minimum bandwidth if the queue length is greater than a predetermined length.

5. The network node of claim 1, wherein said control circuitry is arranged to:
monitor a queue length of packets stored in said buffer; and
decrease said decision threshold if the queue length is greater than a predetermined length.

6. A network node comprising:
first and second first-in-first-out buffers connected to a transmission medium;
detection circuitry for receiving an incoming packet and detecting a virtual connection and a class of the received packet; and
control circuitry for calculating a value of delivery instant according to a minimum bandwidth assigned to the detected virtual connection so that vacancy of said transmission medium is reduced to a minimum if the received packet were delivered from either of said buffers onto said transmission medium at the instant of the calculated value, comparing the calculated value with a decision threshold assigned to the detected virtual connection, storing the received packet into one of said buffers depending on the detected class of the packet if the calculated value is smaller than the decision threshold, discarding the received packet if the calculated value is greater than the decision threshold, monitoring storage level of said first buffer and delivering packets from the second buffer onto the transmission medium if the first buffer is vacant and packets from the first buffer onto the transmission medium if the first buffer is not vacant.

7. The network node of claim 6, wherein said control circuitry is arranged to calculate said value according to a data length of the received packet.

8. The network node of claim 6, wherein said control circuitry is arranged to calculate said value according to a weight coefficient assigned to the detected virtual connection.

9. A network node comprising:
a first-in-first-out buffer connected to a transmission medium;
a memory; and
an LSI (large scale integration) chip including:
detection circuitry for receiving an incoming packet and detecting a virtual connection of the received packet, and
control circuitry for reading a calculated value of delivery instant from said memory, recalculating a value of delivery instant using the value read from said memory according to a minimum bandwidth assigned to the detected virtual connection so that vacancy of said transmission medium is reduced to a minimum if the received packet were delivered from said buffer onto said transmission medium at the instant of the recalculated value, comparing the recalculated value with a decision threshold assigned to the detected virtual connection, storing the received packet into said buffer if the recalculated value is smaller than the decision threshold, discarding the received packet and resetting the recalculated value to the read value if the recalculated value is greater than the decision threshold, and storing both of the recalculated and reset values of delivery instant into said memory.

10. The network node of claim 9, wherein said control circuitry is arranged to calculate said value according to a data length of the received packet.

11. The network node of claim 9, wherein said control circuitry is arranged to calculate said value according to a weight coefficient assigned to the detected virtual connection.

12. The network node of claim 9, wherein said control circuitry is arranged to:
monitor a queue length of packets in said buffer; and
decrease said assigned minimum bandwidth if the queue length is greater than a predetermined length.

13. The network node of claim 9, wherein said control circuitry is arranged to:
monitor a queue length of packets in said buffer; and
decrease said decision threshold if the queue length is greater than a predetermined length.

14. A method of controlling packets to be discarded or stored into a first-in-first-out buffer connected to a transmission medium, comprising the steps of:
a) receiving an incoming packet and detecting a virtual connection of the received packet;
b) calculating a value of delivery instant according to a minimum bandwidth assigned to the detected virtual connection so that vacancy of said transmission medium is reduced to a minimum if the received packet were delivered front said buffer onto said transmission medium at the instant of the calculated value;
c) comparing the calculated value with a decision threshold assigned to a connection indicated by said identifier; and
d) storing the received packet into said buffer if the calculated value is smaller than the decision threshold, and discarding the received packet if the calculated value is greater than the decision threshold.

15. The method of claim 14, wherein the step (b) comprises calculating said value of delivery instant according to a weight coefficient assigned to the detected virtual connection.

16. The method of claim 14, wherein the step (b) comprises calculating said value of delivery instant according to a weight coefficient assigned to the detected virtual connection.

17. The method of claim 15, wherein the step (b) further comprises the steps of;
monitoring a queue length of packets in said buffer; and
decreasing said assigned minimum bandwidth if the queue length is greater than a predetermined length.

18. The method of claim 14, wherein the step (b) further comprises the steps of:
monitoring a queue length of packets in said buffer; and
decreasing said decision threshold if the queue length is greater than a predetermined length.

19. A method of controlling packets to be discarded or stored into first and second first-in-first-out buffers connected to a transmission medium, comprising; the steps of;
a) receiving an incoming packet and detecting a virtual connection and a class of the received packet; and
b) calculating a value of delivery instant according to a minimum bandwidth assigned to the detected virtual connection so that vacancy of said transmission medium is reduced to a minimum if the received packet were delivered from either of said buffers onto said transmission medium at the instant of the calculated value;
c) comparing the calculated value with a decision threshold assigned to the detected virtual connection;

d) storing the received packet into one of said first and second buffers depending on the detected class if the calculated value is smaller than the decision threshold;

e) discarding the received packet if the calculated value is greater than the decision threshold; and f) monitoring storage level of said first buffer and delivering packets from the second buffer onto the transmission medium if the first buffer is vacant and packets from the first buffer onto the transmission medium if the first buffer is not vacant.

20. A method of controlling packets, comprising the steps of:

a) receiving an incoming packet and detecting a virtual connection of the received packet;

b) reading a calculated value of delivery instant of the received packet from a memory;

c) recalculating a value of delivery instant of the received packet using the value read from said memory according to a minimum bandwidth assigned to the detected virtual connection so that vacancy of said transmission medium is reduced to a minimum if the received packet were delivered from said buffer onto said transmission medium at the instant of the recalculated value;

d) comparing the recalculated value with a decision threshold assigned to the detected virtual connection;

e) storing the received packet into said buffer if the recalculated value is smaller than the decision threshold;

f) discarding the received packet and resetting the recalculated value to the read value if the recalculated value is greater than the decision threshold; and g) storing both of the recalculated and reset values of delivery instant into said memory.

21. A method of controlling packets, comprising the steps of:

a) receiving a packet of a particular virtual connection or a packet of other virtual connection, detecting a time interval between a previous packet and the received packet, and setting an arrival time value V of every packet to a previous variable plus the detected time interval;

b) setting an arrival time value R of the packet of said particular virtual connection to the arrival time value V;

c) updating the previous variable with a minimum bandwidth value assigned to said particular virtual connection, said arrival time values V and R and a previous delivery time value F of the packet of said particular virtual connection;

d) updating the previous delivery time value F with said minimum bandwidth value and the arrival time value V;

e) comparing the updated delivery time value F with a decision threshold which is equal to the arrival time value V plus a threshold value assigned to said particular virtual connection;

storing the packet of said particular virtual connection into a first-in-first-out buffer if the updated delivery time value F is smaller than the decision threshold and resetting the updated delivery time value F to the previous delivery time value and discarding the packet of said particular virtual connection if the updated delivery time value F is greater than said decision threshold; and g) repeating the steps (a) to (f).

22. The method of claim 21, wherein the step (c) comprises updating the previous variable with a length of the packet of said particular virtual connection in addition to said minimum bandwidth value.

23. A method of controlling packets, comprising the steps of:

a) setting an arrival time value V equal to a previous variable plus unity and updating the previous variable with a time interval T which is an integral multiple of a minimum interval between successive packets of any virtual connection;

b) receiving a packet of a particular virtual connection or a packet of other virtual connection and comparing the arrival time value V with a previous arrival time value R of the packet of the particular virtual connection;

c) if the arrival time value V is not equal to the previous arrival time value R, updating the previous variable with a previous delivery time value P of the packet of said particular virtual connection, the arrival time value V weighted by a coefficient assigned to said particular virtual connection and the previous arrival time value R weighted by said coefficient, and setting a current arrival time R of the packet of said particular virtual connection to the arrival time value V;

d) updating the previous delivery time value F with the weighted arrival time value V;

e) if the arrival time V is equal to the previous arrival time value R, repeating the step (d);

f) comparing the updated delivery time value F with a decision threshold which is equal to the weighted arrival time value V plus a threshold value assigned to said particular virtual connection;

g) storing the packet of said virtual connection into a first-in-first-out buffer if the updated delivery time value F is smaller than the decision threshold and resetting the updated delivery time value F to the previous delivery time value and discarding the packet of said particular virtual connection if the updated delivery time value F is greater than said decision threshold; and h) repeating the steps (b) to (g) if a packet arrives; and i) repeating the step (a) at T-intervals.

* * * * *

UNITED STATES PATENT AND TRADEMARK OFFICE
CERTIFICATE OF CORRECTION

PATENT NO. : 6,173,331 B1
DATED : January 9, 2001
INVENTOR(S) : Hideyuki Shimonishi It is certified that error appears in the above-identified patent and that said Letters Patent is hereby corrected as shown below:

Title page,
Item [57] ABSTRACT, "co" should read -- to --

Column 3,
Line 41, "op" should read -- of --

Column 12, claim 14,
Line 25, "front" should read -- from --

Column 12, claim 17,
Line 44, "of;1" should read -- of: --

Column 12, claim 19,
Line 56 "comprising;the steps of;" should read -- comprising the steps of: --

Column 14, claim 23,
Line 29, "P" should read -- F --

Signed and Sealed this

First Day of January, 2002

Attest:

JAMES E. ROGAN
*Attesting Officer*  *Director of the United States Patent and Trademark Office*